(12) United States Patent
Clark

(10) Patent No.: US 10,702,359 B2
(45) Date of Patent: Jul. 7, 2020

(54) DENTAL IMPLANT CLEANING SYSTEMS AND METHODS

(71) Applicant: Ken E Clark, Wailuku, HI (US)

(72) Inventor: Ken E Clark, Wailuku, HI (US)

( * ) Notice: Subject to any disclaimer, the term of this patent is extended or adjusted under 35 U.S.C. 154(b) by 661 days.

(21) Appl. No.: 15/394,110

(22) Filed: Dec. 29, 2016

(65) Prior Publication Data
US 2018/0153667 A1 Jun. 7, 2018

Related U.S. Application Data (60) Provisional application No. 62/428,969, filed on Dec. 1, 2016.

(51) Int. Cl.
*A61C 15/00* (2006.01)
*A61C 17/00* (2006.01)
*A61C 15/04* (2006.01)

(52) U.S. Cl.
CPC .......... *A61C 17/036* (2013.01); *A61C 15/041* (2013.01)

(58) Field of Classification Search
CPC .... A61C 17/036; A61C 15/041; A61C 15/042
See application file for complete search history.

(56) References Cited

U.S. PATENT DOCUMENTS

| | | | |
|---|---|---|---|
| 2,522,794 A | 9/1950 | Medof | |
| 3,559,226 A | 2/1971 | Burns | |
| 3,930,059 A * | 12/1975 | Wells | A61C 15/041 427/2.29 |
| 4,008,727 A | 2/1977 | Thornton | |
| 4,011,658 A | 3/1977 | Tarrson | |
| 4,133,339 A | 1/1979 | Naslund | |
| 4,142,538 A | 3/1979 | Thornton | |
| 4,217,099 A | 8/1980 | Thornton | |
| 4,326,547 A | 4/1982 | Verplank | |
| 4,633,892 A | 1/1987 | Charatan | |
| 4,832,063 A * | 5/1989 | Smole | A61C 15/041 132/321 |
| 4,911,927 A * | 3/1990 | Hill | A61C 15/041 132/323 |
| 4,941,227 A | 7/1990 | Sussman | |
| 4,974,614 A * | 12/1990 | Selker | A61C 15/041 132/321 |
| 5,063,948 A | 11/1991 | Lloyd | |
| 5,067,195 A | 11/1991 | Sussman | |
| 5,242,301 A | 9/1993 | Hickey | |

(Continued)

OTHER PUBLICATIONS

Clean Bottle—downloaded from http://www.cleanbottle.com on Apr. 2, 2017.

(Continued)

*Primary Examiner* — Nicholas D Lucchesi (57) ABSTRACT

A dental implant cleaning device can include a first elongated member having a first end and a second end located opposite the first end. The dental implant cleaning device can include an elongated cleaning member having a first cleaning end and a second cleaning end located opposite the first cleaning end. The first cleaning end can be attached to the second end. The dental implant cleaning device can also include a second elongated member having a third end and a fourth end located opposite the third end. The third end can be attached to the second cleaning end.

18 Claims, 5 Drawing Sheets

(56) References Cited

U.S. PATENT DOCUMENTS

| | | | |
|---|---|---|---|
| 5,311,890 A | | 5/1994 | Thornton |
| 5,316,028 A | | 5/1994 | Flemming |
| 5,392,794 A | * | 2/1995 | Striebel ................ A61C 15/042 |
| | | | 132/321 |
| 5,433,226 A | | 7/1995 | Burch |
| 5,682,911 A | | 11/1997 | Harada |
| 5,775,346 A | * | 7/1998 | Szyszkowski ......... A61C 15/00 |
| | | | 132/321 |
| 5,878,758 A | * | 3/1999 | Bacino ............. A61B 17/06166 |
| | | | 132/321 |
| 5,940,923 A | | 8/1999 | Gunning |
| 6,003,525 A | * | 12/1999 | Katz .................... A61C 15/041 |
| | | | 132/321 |
| 6,250,313 B1 | * | 6/2001 | Rees .................... A61C 15/042 |
| | | | 132/321 |
| 6,644,323 B1 | | 11/2003 | Clark |
| 6,672,316 B1 | | 1/2004 | Weihrauch |
| 8,439,049 B2 | | 5/2013 | Lavrova |
| 8,505,148 B2 | | 8/2013 | Aitkin |
| 8,534,300 B2 | * | 9/2013 | Jones .................... A61C 15/045 |
| | | | 132/200 |
| 8,800,574 B2 | * | 8/2014 | Hanrahan ............ A61C 15/043 |
| | | | 132/325 |
| 2001/0029962 A1 | | 10/2001 | Bergman |
| 2006/0110709 A1 | | 5/2006 | Clark |
| 2008/0038690 A1 | * | 2/2008 | Allen ....................... A61C 3/06 |
| | | | 433/142 |
| 2010/0300481 A1 | * | 12/2010 | Lavrova ............... A61C 15/041 |
| | | | 132/321 |
| 2011/0277783 A1 | * | 11/2011 | Lavrova ............... A61C 15/041 |
| | | | 132/329 |
| 2012/0145181 A1 | | 6/2012 | Slack |
| 2013/0118519 A1 | * | 5/2013 | Jones .................... A61C 15/04 |
| | | | 132/200 |
| 2013/0174866 A1 | * | 7/2013 | Slack .................... A61C 15/041 |
| | | | 132/325 |
| 2014/0295378 A1 | | 10/2014 | Lyngstadaas |
| 2015/0122281 A1 | * | 5/2015 | Martens ............... A61C 15/042 |
| | | | 132/200 |

OTHER PUBLICATIONS

Shop Shape—downloaded from http://www.shape.com on Apr. 2, 2017.

BaijiBottle—downloaded from http://www.baijibottle.com on Apr. 2, 2017.

* cited by examiner

DENTAL IMPLANT CLEANING SYSTEMS AND METHODS

CROSS-REFERENCE TO RELATED APPLICATIONS

This application claims the benefit of U.S. Provisional Patent Application No. 62/428,969; filed Dec. 1, 2016; and entitled DENTAL IMPLANT FLOSS DEVICE AND SYSTEM. The entire contents of U.S. Provisional Patent Application No. 62/428,969 are incorporated herein by reference.

BACKGROUND

Field

The present invention relates to the field of dental floss constructions in general and in particular to a dental floss construction specifically designed for use with fixed posts and bars employed on dental implants.

Description of Related Art

As most dental implant wearers are all too well aware, a crucial part of their dental hygiene regimen involves removing trapped food particles and plaque that are deposited on and build up around the metal bars and posts that are supported by the dental implant.

As can be seen by reference to the following U.S. Pat. Nos. 3,896,824; 4,142,538; 4,265,258; and, 5,063,948, the prior art is replete with myriad and diverse dental floss constructions. While the aforementioned prior art constructions can be adequate for the purpose and function for which they have been designed, they are deficient with respect to their failure to provide a simple, efficient, and practical dental floss construction that is specifically designed to clean the bars and posts that are supported by dental implants.

Specifically, the aforementioned prior art constructions can be difficult to navigate around metal support posts and support bars attached to dental implants. Additionally, the prior art constructions can be quite harsh on the surfaces used in dental implants, thereby causing damage to the implant and oftentimes requiring replacement. Thus, there is a need for devices and systems that navigate around the various surfaces of dental implant prosthetics, while also safely and effectively cleaning the periphery of the support posts and support bars.

SUMMARY

The disclosure includes a dental implant cleaning device including a first elongated member having a first end and a second end located opposite the first end, an elongated cleaning member having a first cleaning end and a second cleaning end located opposite the first cleaning end. The first cleaning end can be attached to the second end. The cleaning device can also include a second elongated member having a third end and a fourth end located opposite the third end. The third end can be attached to the second cleaning end.

In some embodiments, the first end and the fourth end are deformable. Furthermore, the first end and the fourth end can be arranged and configured to move between and retain a first shape and a second shape. In some embodiments, the first end and the fourth end are deformed. Additionally, the at least one of the first end and the fourth end can define a hook shape.

Even still, in some embodiments, the first elongated member and the second elongated member are constructed of a soft flexible elastic polymer. The soft flexible elastic polymer can comprise at least one of a Thermoplastic elastomer, nylon, polyester, polypropylene, and polyethylene. The Thermoplastic elastomer can comprise at least one of Styrenic block copolymers (TPE-s), Thermoplastic olefins (TPE-o), Elastomeric alloys (TPE-v and TPV), Thermoplastic polyurethanes (TPU), Thermoplastic copolyester, Thermoplastic polyamides, Thermoset elastomers, Thermoplastic polyurethane (TPU-s), and Tetrahydrofuran (THF).

In several embodiments, the first end and the fourth end comprise a uniform cross-sectional surface arranged and configured to protect a user's gums. The first elongated member and the second elongated member can each define a uniform cross-section comprising only the soft flexible elastic polymer.

As well, in some embodiments, the first cleaning end is attached to the second end by at least one of chemical bonding and thermal bonding. Additionally, the second cleaning end can be attached to the third end by at least one of chemical bonding and thermal bonding.

In some embodiments, the first elongated member defines a first middle region located between the first end and the second end, and the second elongated member defines a second middle region located between the third end and the fourth end. The first middle region and the second middle region can define a first thickness, and the first cleaning end and the second cleaning end define a second thickness that is greater than the first thickness.

In several embodiments, the first elongated member and the second elongated member define a circular perimeter, and the elongated cleaning member defines a rectangular perimeter. A diameter of the first elongated member can be between 2 mm and 3 mm, and a diameter of the second elongated member can be between 2 mm and 3 mm. Additionally, the elongated cleaning member can define a first cross-sectional dimension substantially equal to 2 mm×1 mm, and a second cross-sectional dimension substantially equal to 2 mm×1.75 mm.

Even still, in some embodiments, the elongated cleaning member defines four sides each comprising at least one of cross-hatching and a plurality of dimples. The four sides of the elongated cleaning member can be arranged and configured to remove plaque and food particles from a periphery of a metal support post and a metal bar of a dental implant. Furthermore, the four sides of the elongated cleaning member can be arranged and configured to not damage the metal support post and the metal bar of the dental implant. The at least one of cross-hatching and plurality of dimples define a distance between hatches and dimples. In several embodiments, the distance is between 0.25 mm and 1 mm.

In some embodiments, the elongated cleaning member comprises at least one of sodium bicarbonate, calcium bicarbonate, sodium hydrogen carbonate, and a low abrasion water-soluble mineral. The elongated cleaning member can also define a flavor comprising at least one of peppermint, spearmint, and cinnamon.

In several embodiments, the first elongated member defines a length that is between 75 mm and 95 mm, the elongated cleaning member defines a length that is between 50 mm and 90 mm, and the second elongated member defines a length that is between 75 mm and 95 mm. The first elongated member, the elongated cleaning member, and the second elongated member can define a total length that is substantially equal to 240 mm.

In some embodiments, the first elongated member and the second elongated member define a first hardness that is less than or equal to a Shore A hardness of 50. Additionally, the elongated cleaning member can define a second hardness that is less than or equal to a Shore A hardness of 50. In some embodiments, the second hardness is different from the first hardness. However, in some embodiments, the second hardness is the same as the first hardness.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION OF THE DRAWINGS

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

LIST OF REFERENCE NUMERALS

10—Dental implant cleaning device
12—First elongated member
14—Elongated cleaning member
16—Second elongated member
18—First end
20—Second end
22—First cleaning end
24—Second cleaning end
26—Third end
28—Fourth end
30—Middle region
32—First thickness
34—Second thickness
36—First cross-sectional dimension
38—Second cross-sectional dimension
40—First shape
42—Second shape
44—Distance
50—First length
52—Second length
54—Third length
56—Total length
60—Height
100—Dental implant
101—Support post
102—Support bar
103—Gum line Introduction The present disclosure describes dental implant cleaning devices and systems. The devices and systems disclosed herein can remedy the deficiencies of the prior art by providing an elongated cleaning member having deformed and/or deformable end(s) that can assist in allowing the cleaning device to navigate around the bars 102 and posts 101 of dental implants 100. Additionally, the devices and systems disclosed can provide a soft, yet abrasive surface to effectively and safely clean the surfaces of dental implants 100.

The foregoing and other objects, features and advantages of the invention will become more readily apparent from the following detailed description of the invention that proceed with reference to the accompanying drawings.

Cleaning Devices and Systems

Figure 1:
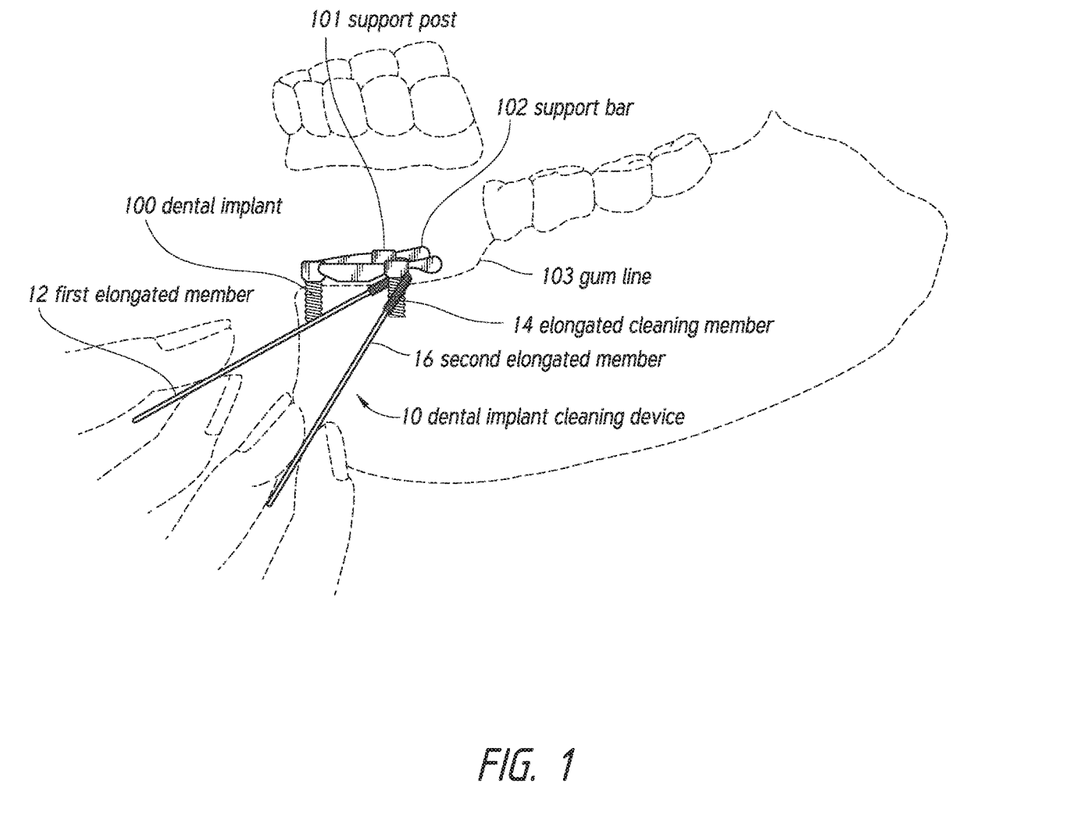
FIG. 1 is a perspective view of the dental floss construction operatively engaged with one of the metal support posts of a dental implant, according to some embodiments.

FIG. 1 illustrates a dental implant coupled to (i.e. implanted in) the jaw of a patient. FIG. 1 also shows a dental implant cleaning device 10 arranged and configured to safely and effectively clean posts 101 and bars 102 of dental implants 100 (further shown in FIGS. 3A and 3B).

Figure 2A:
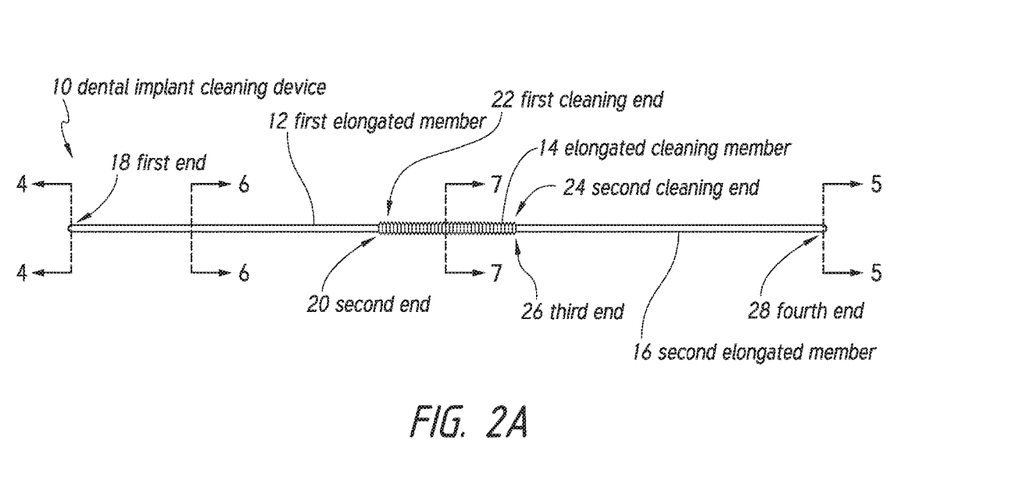
FIGS. 2A and 2B are isolated perspective views of the dental floss construction, according to some embodiments.
Figure 2B:
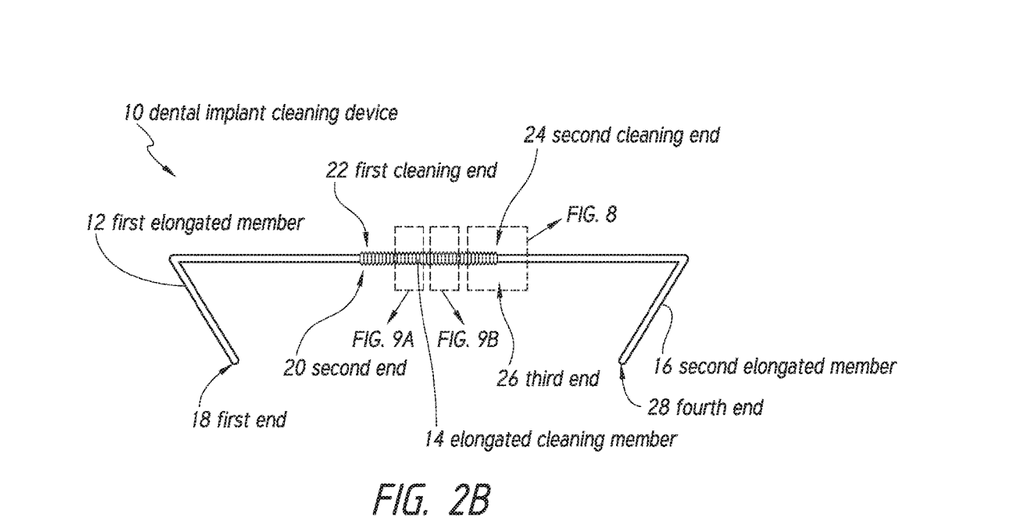

As shown in FIG. 2A, the dental implant cleaning device 10 can include a first elongated member 12 having a first end 18 and a second end 20 located opposite the first end 12. The cleaning device 10 can also include an elongated cleaning member 14 having a first cleaning end 22 and a second cleaning end 24 located opposite the first cleaning end 22. According to the embodiment shown in FIG. 2A, the first cleaning end 22 is attached to the second end 20. The cleaning device 10 can also include a second elongated member 16 having a third end 26 and a fourth end 28 located opposite the third end 26. As shown in FIG. 2A, the third end 26 can be attached to the second cleaning end 24. In some embodiments, the first cleaning end 22 is bonded attached to the second end 20 by chemical bonding and/or thermal bonding. Accordingly, the second cleaning end 24 can be attached to the third end 26 by chemical bonding and/or thermal bonding.

With reference to FIG. 2A, in some embodiments, the first end 18 and the fourth end 28 include configurations to assist in cleaning dental implants 100, such as being deformable. In other words, the first end 18, the fourth end 28, and the respective regions adjacent to the first end 18 and the fourth end 28 can change their shape and thereby retain different shapes. Stated differently, the first end 18 and the fourth end 28 can be arranged and configured to move between and retain a first shape and a second shape, such as a shape that would allow a user to more easily navigate the cleaning device 10 around the features of the dental implant 100.

Additionally, the first end 18 and the fourth end 28 can also be deformed. In some embodiments, at least one of the first end 18 and the fourth end 28 define a shape (e.g. as a hook shape) after being manufactured. It should be appreciated that the first end 18 and the fourth end 28 can define any appropriate shape that can hook around the bars 102 and posts 101 of a dental implant 100.

Figure 3A:
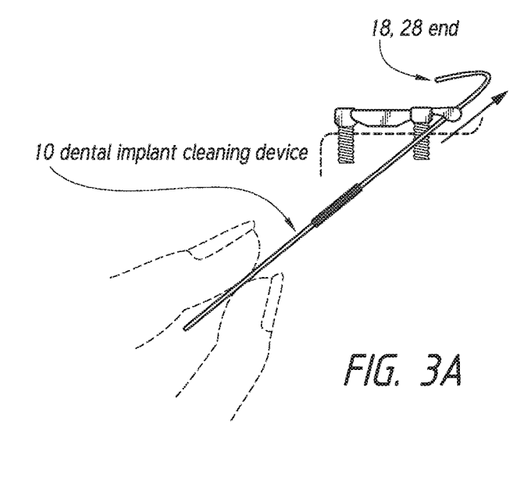
FIGS. 3A, 3B, and 3C illustrate the manipulation of the dental floss construction to clean the periphery of the dental implant support posts and bar, according to some embodiments.
Figure 3B:
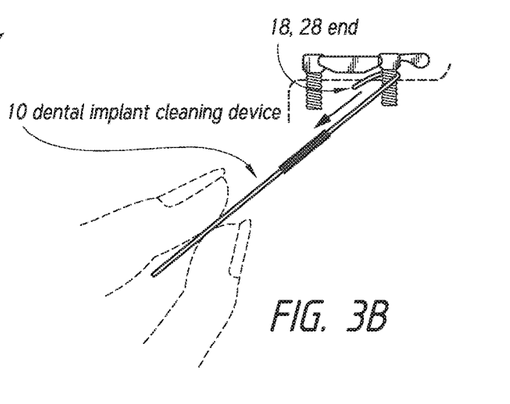
Figure 3C:
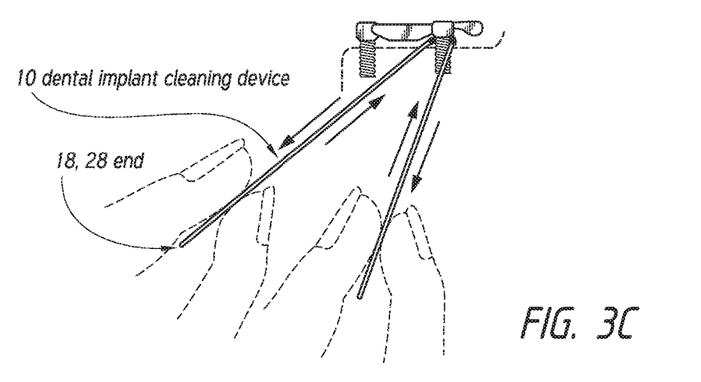

The benefits of using a hook shape, or any such appropriate shape, can be more easily understood as shown in the illustrations of FIGS. 3A, 3B, and 3C. For example, as shown in FIG. 3A and 3B, if the first end 18 and/or the fourth end 28 define a hook shape, the dental implant cleaning device 10 can more easily navigate around the bars 102 or posts 101 of the dental implant 100. As further shown in FIG. 3C, the first end 18 and/or the fourth end 28, whichever end is wrapped around the dental implant bar 102 or post 101 first, can be deformed back to a straight line so that the user can maximize the length of the cleaning device 10 and more easily maneuver the cleaning device 10, in a back and forth motion, across the bars 102 and posts 101 of the dental implant 100.

Figure 4:
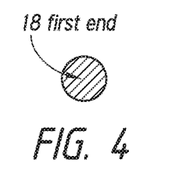
FIG. 4 is a cross-sectional view of the first end taken at line 4-4, according to some embodiments.
Figure 5:
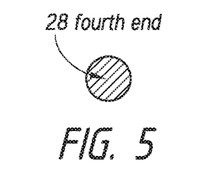
FIG. 5 is a cross-sectional view of the fourth end taken at line 5-5, according to some embodiments.

Because various portions of the dental implant cleaning device 10, such as the first end 18 and the fourth end 28, are placed in close proximity to a user's gums and other sensitive tissue, the cleaning device 10 can be arranged and configured to protect the sensitive tissue of the user. As shown in FIGS. 4 and 5, in some embodiments, the first end 18 and the fourth end 28 can comprise a uniform and smooth cross-sectional surface. As such, if the uniform cross-sectional surface contacts sensitive tissue, it may not irritate the sensitive tissue. Furthermore, in some embodiments, the first elongated member 12 and the second elongated member 16 can each define a uniform cross-section comprising only the soft flexible elastic polymer throughout its entire length.

Figure 6:
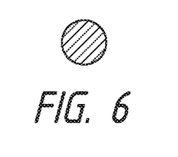
FIG. 6 is a cross-sectional view of one of the end units taken through line 6-6 of FIG. 2A, according to some embodiments.
Figure 7:
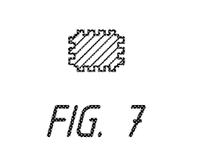
FIG. 7 is a cross-sectional view of the intermediate flossing unit taken through line 7-7 of FIG. 2B, according to some embodiments.

As illustrated in FIGS. 6 and 7, various segments (or members) of the dental implant cleaning device 10 can define different cross-sectional shapes. With reference to FIG. 6, the first elongated member 12 and the second elongated member 16 can define a circular cross-sectional shape (i.e. round perimeter or circular perimeter). As shown in FIG. 7, the elongated cleaning member 14 can define a rectangular cross-sectional shape (i.e. rectangular perimeter). Various cross-sectional shapes can be used for any such reason, including anatomical variations amongst patients, size of dental implant posts 101 and bars 102, type of dental implant posts 101 and bars 102, materials used in the dental implant posts 101 and bars 102, and the like. As such, it should be appreciated that the first elongated member 12 and second elongated member 16 can define any such cross-sectional shape, such as a triangular, rectangular, and the like. Accordingly, it should also be appreciated that the elongated cleaning member 14 can define any such cross-sectional shape, such as a triangular, round (or circular), and the like.

With reference to FIGS. 4 and 5, round cross-sectional configurations of the dental implant cleaning device 10 can define various diameters. In some embodiments, the diameters of the first elongated member 12 and the second elongated member 16 are between 2 mm and 3 mm. However, it should be appreciated that the diameter of the respective first elongated member 12 and the second elongated member 16 can define any diameter less than or equal to 2 mm, and greater than or equal to 3 mm.

Figure 8:
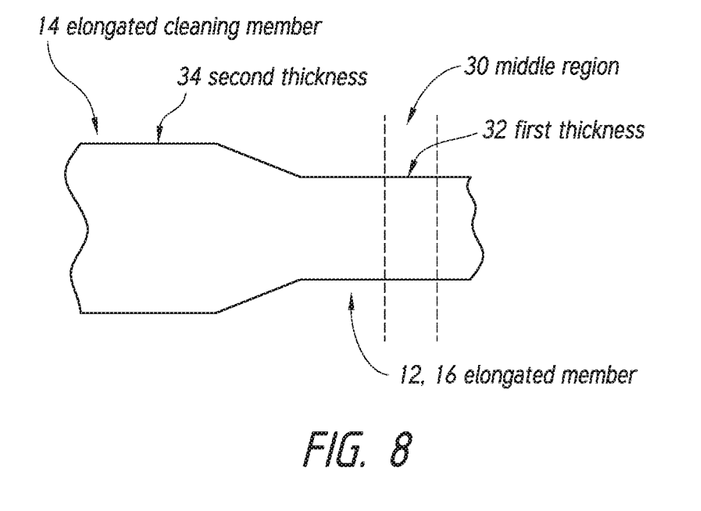
FIG. 8 is a close-up view of the region as detailed in FIG. 2B, according to some embodiments.

Furthermore, the dental implant cleaning device 10 can define differing thicknesses, widths, and even diameters along various portions of the cleaning device 10. In this manner, the cleaning device 10 can be sized and configured to accommodate different size dental implant posts 101 and bars 102, anatomical variations amongst patients, and the like. For example, as shown in FIG. 8, the elongated members 12,16 can define a middle region 30 located between the first end 18 and the second end 20 (of the first elongated member 12), and/or located between the third end 26 and the fourth end 28 (of the second elongated member 16). The respective middle region 30 can define a first thickness 32. Accordingly, the elongated cleaning member 14 (e.g. the first cleaning end 22 and the second cleaning end 24) can define a second thickness 34. In some embodiments, the second thickness 34 is greater than or equal to the first thickness 32. However, in some embodiments, the second thickness 34 is less than or equal to the first thickness 32.

Figure 9A:
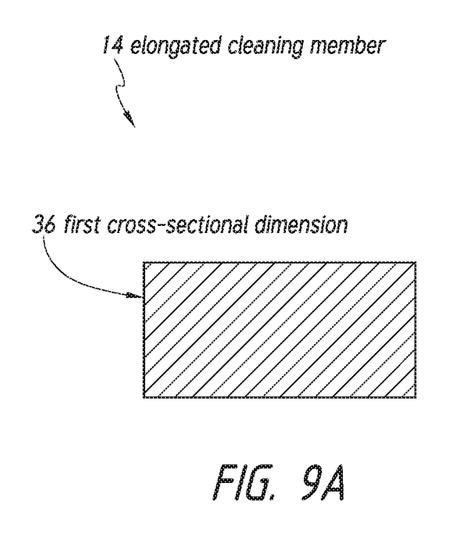
FIGS. 9A and 9B illustrate close-up views of the region as detailed in FIG. 2B, according to some embodiments.
Figure 9B:
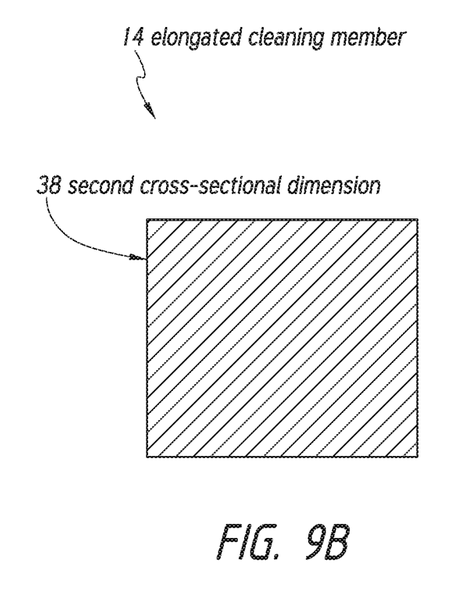

Moreover, with reference to FIGS. 9A and 9B, different locations of the elongated cleaning member 14 can define different cross-sectional dimensions. For example, a first location of the elongated cleaning member 14 can define a first cross-sectional dimension 36, and a second location of the elongated cleaning member 14 can define a second cross-sectional dimension 38. In some embodiments, the first cross-sectional dimension 36 is approximately equal to 2 mm×1 mm and the second cross-sectional dimension is approximately equal to 2 mm×1.75 mm. However, in other embodiments, the cross-sectional dimension, (i.e. thickness and/or width) can be equal to any dimension. For example, the width of the elongated cleaning member 14 can taper or vary between 2 mm and 1 mm. Additionally, the thickness of the elongated cleaning member 14 can taper or vary between 1 mm and 0.5 mm. For example, some embodiments of the elongated cleaning member 14 may have a first cross-sectional dimension equal to 2 mm×1 mm at the first location, and a second cross-sectional dimension equal to 1.4 mm×0.7 mm at the second location. In this regard, the cleaning device 10 can be tapered up or down at various locations, to accommodate smooth transitions between elongated members of the device 10.

Figure 10A:
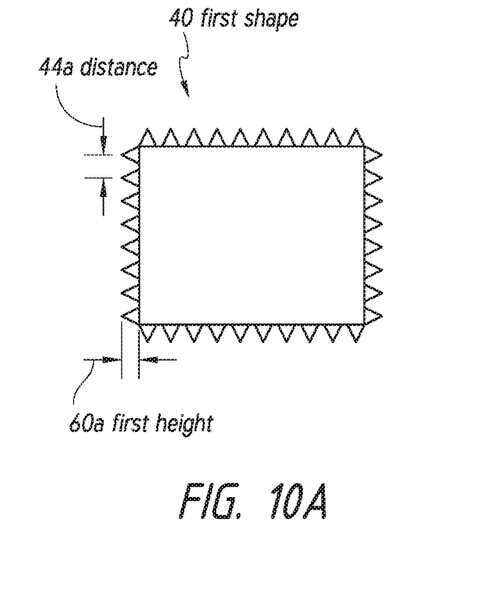
FIGS. 10A and 10B illustrate cross-sectional views of the elongated cleaning member, according to various embodiments.
Figure 10B:
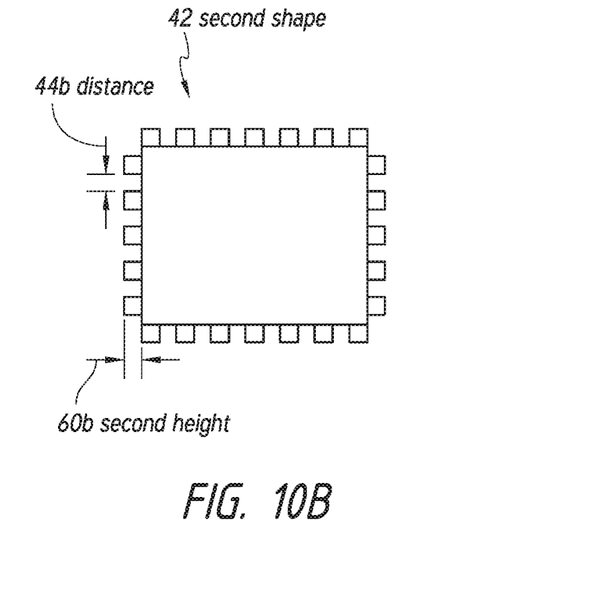

Furthermore, as shown in FIGS. 10A and 10B, the sides of the elongated cleaning member 14 can include various features, such as cross-hatching and a plurality of dimples, that remove plaque and food particles from a periphery of the support bars 102 and posts 101 of the dental implant 100. As illustrated in FIG. 10A, the cross-hatching and plurality of dimples can define a first shape 40, such as a triangular shape. As shown in FIG. 10B, the cross-hatching and plurality of dimples can define a second shape 42, such as a rectangular shape. Additionally, each of the respective cross-hatches and dimples can be spaced by varying distances, as illustrated by the first dimension 44*a* and the second dimension 44*b*. In some embodiments, the spacing distances 44*a*, 44b are any distance between 0.25 mm and 1.75 mm. As well, each of the respective cross-hatches and dimples can be sized and configured to any such height (i.e. first height 60a and second height 60b), such as 0.5 mm to 1 mm, and any such width, for example 0.5 mm to 1 mm (width is not shown in the Figures, but the width in this regard would be perpendicular to the height).

Figure 11:
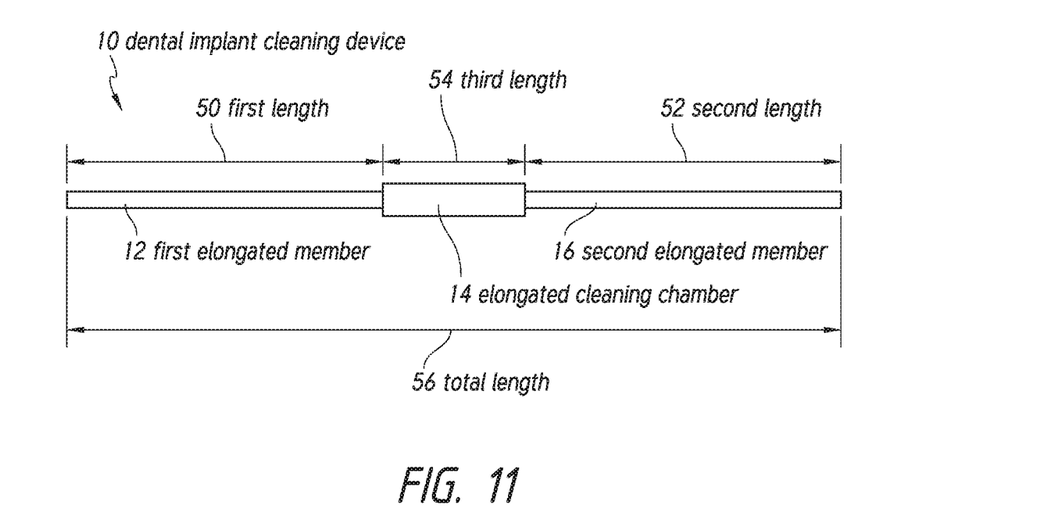
FIG. 11 illustrates the lengths of the dental cleaning implant device, according to some embodiments.

As shown in FIG. 11, the dental implant cleaning device 10 can define various lengths. The first elongated member 12 can define a first length 50 that is between 75 mm and 95 mm. Additionally, the second elongated member 16 can define a second length 52 that is between 75 mm and 95 mm. As well, the elongated cleaning member 14 can define a third length 54 that is between 50 mm and 90 mm. In some embodiments, the first elongated member 12, the elongated cleaning member 14, and the second elongated member 16 define a total length 56 that is substantially equal to 240 mm. However, it should be appreciated that the first length 50 and second length 52 can be equal to any length less than or equal to 75 mm and greater than or equal to 95 mm. As well, the elongated cleaning member 14 can be equal to any dimension that is less than or equal to 50 mm and greater than or equal to 90 mm.

The first elongated member 12, the second elongated member 16, and the elongated cleaning member 14 can be constructed of any soft, durable, and/or malleable material, such as a soft flexible elastic polymer. In some embodiments, the soft flexible elastic polymer comprises at least one of a thermoplastic elastomer, nylon, polyester, polypropylene, and polyethylene. The thermoplastic elastomer can comprise various materials, such as at least one of styrenic block copolymers (TPE-s), thermoplastic olefins (TPE-o), elastomeric alloys (TPE-v and TPV), thermoplastic polyurethanes (TPU), thermoplastic copolyester, thermoplastic polyamides, thermoset elastomers, thermoplastic polyurethane (TPU-s), and tetrahydrofuran (THF). By using polymers, such as thermoplastics, the cleaning device 10 can be deformed and/or deformable to assist in the cleaning process.

Generally, the elongated cleaning member 14 can be constructed of any elastic polymer, similar synthetic or manmade materials having a relatively high co-efficient of friction. In this regard, the sides of the elongated cleaning member 14 can act like a scouring pad to remove food and plaque particles from the periphery of the metal support bars 102 and posts 101 that are supported by the dental implants 100 in the area between the wearer's gum line 103 and the support bar 102.

Accordingly, the cleaning device 10 can embody various hardness characteristics. In some embodiments, the first elongated member 12 and the second elongated member 16 can define a first hardness that is less than or equal to a Shore A hardness of 50. Accordingly, the elongated cleaning member 14 can define a second hardness that is less than or equal to a Shore A hardness of 50. In some embodiments, the second hardness is different from the first hardness. However, in some embodiments, the second hardness is the same as the first hardness.

Additionally, the various members of the dental implant cleaning device 10 can also include additional materials, such as coatings, that may assist in cleaning, increase longevity, or even change the flavor of the cleaning device 10 to make it more appealing to certain users. For example, the elongated cleaning material 14 can define various flavors, such as peppermint, spearmint, cinnamon, and any other flavor. The elongated cleaning member 14 can include sodium bicarbonate, calcium bicarbonate, sodium hydrogen carbonate, and a low abrasion water-soluble mineral.

It should be appreciated that the dental implant cleaning device 10 and its various features can be manufactured using a variety of methods, such as injection molding, extrusion, and the like.

Methods of Cleaning Dental Implants

As can best be appreciated by reference to FIGS. 1 and 3A-3C, the configuration of the dental implant cleaning device 10 can be employed to clean the support bars 102 and posts 101 of a dental implant 100. As shown in FIGS. 3A and 3B, the user can grasp one of the deformed end units 18, 28 or deform one of the ends 18, 28 into a V or U shape configuration. The user can thereby insert the respective end 18, 28 between a person's gum line 103 and the support bar 102 adjacent to one of the support posts 101.

As shown in FIG. 3C, the user can thereby feed the deformed and/or deformable end 18, 28 between the gum line and support bar 102 and around the support post 101 and then grasp both ends 18, 28. Once both ends 18, 28 are grasped tightly; the support post 101 can be captively surrounded by the elongated cleaning member 14. When the user begins moving the cleaning device 10 in a reciprocal motion, back and forth, across the respective portions of the support post 101, this will cause the elongated cleaning member 14 to scrub the periphery of the support post 101 and or the support bar 102 to remove food and plaque particles therefrom.

Interpretation

For the purposes of this disclosure, the term "substantially" should be understood to mean for the most part or to a great or significant extent. For purposes of this disclosure, the term "substantially" can also be used interchangeably with the term "approximately", which can hereby mean that something is almost, but not completely, accurate or exact (i.e. roughly). For example, to state that a dimension is substantially or approximately equal to a specific dimension may be interpreted to mean that the dimension is within ±5% (e.g. if a length is substantially equal to 240 mm, the actual length may be 228 mm to 252 mm).

None of the structures and/or devices described herein is essential or indispensable. Any of the structures and/or devices can be adjusted or modified. Other or additional structures and/or devices can be used. Any portion of any of the structures and/or devices disclosed or illustrated in one embodiment or example in this specification can be combined or used with or instead of any other portion of any of the structures, and/or devices disclosed or illustrated in a different embodiment or example. The embodiments and examples provided herein are not intended to be discrete and separate from each other.

The section headings and subheadings provided herein are non-limiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A dental implant cleaning device, comprising:
   a first elongated member having a first end and a second end located opposite the first end;
   an elongated cleaning member having a first cleaning end and a second cleaning end located opposite the first cleaning end, wherein the first cleaning end is attached to the second end and wherein the elongated cleaning member defines a rectangular perimeter;
   a second elongated member having a third end and a fourth end located opposite the third end, wherein the third end is attached to the second cleaning end;
   wherein first elongated member and the second elongated member define a circular perimeter;
   wherein the elongated cleaning member defines four sides each comprising at least one of cross-hatching and a plurality of dimples, wherein the four sides of the elongated cleaning member are arranged and configured to remove plaque and food particles from a periphery of a metal support post and a metal bar of a dental implant, and wherein the four sides of the elongated cleaning member are arranged and configured to not damage the metal support post and the metal bar of the dental implant.

2. The dental implant cleaning device of claim 1, wherein the first end and the fourth end are deformable.

3. The dental implant cleaning device of claim 2, wherein the first end and the fourth end are arranged and configured to move between and retain a first shape and a second shape.

4. The dental implant cleaning device of claim 1, wherein the first end and the fourth end are deformed.

5. The dental implant cleaning device of claim 4, wherein at least one of the first end and the fourth end define a hook shape.

6. The dental implant cleaning device of claim 1, wherein the first elongated member and the second elongated member are constructed of a soft flexible elastic polymer.

7. The dental implant cleaning device of claim 6, wherein the soft flexible elastic polymer comprises at least one of a Thermoplastic elastomer, nylon, polyester, polypropylene, and polyethylene, wherein the Thermoplastic elastomer comprises at least one of Styrenic block copolymers (TPE-s), Thermoplastic olefins (TPE-o), Elastomeric alloys (TPE-v and TPV), Thermoplastic polyurethanes (TPU), Thermoplastic copolyester, Thermoplastic polyamides, Thermoset elastomers, Thermoplastic polyurethane (TPU-s), and Tetrahydrofuran (THF).

8. The dental implant cleaning device of claim 6, wherein the first end and the fourth end comprise a uniform cross-sectional surface arranged and configured to protect a user's gums, and wherein the first elongated member and the second elongated member each define a uniform cross-section comprising only the soft flexible elastic polymer.

9. The dental implant cleaning device of claim 1, wherein the first cleaning end is attached to the second end by at least one of chemical bonding and thermal bonding, and the second cleaning end is attached to the third end by at least one of chemical bonding and thermal bonding.

10. The dental implant cleaning device of claim 1, wherein the first elongated member defines a first middle region located between the first end and the second end, and the second elongated member defines a second middle region located between the third end and the fourth end, and wherein the first middle region and the second middle region define a first thickness, and wherein the first cleaning end and the second cleaning end define a second thickness that is greater than the first thickness.

11. The dental implant cleaning device of claim 1, wherein a diameter of the first elongated member is between 2 mm and 3 mm, and a diameter of the second elongated member is between 2 mm and 3 mm.

12. The dental implant cleaning device of claim 1, wherein the elongated cleaning member defines a first cross-sectional dimension substantially equal to 2 mm×1 mm, and a second cross-sectional dimension substantially equal to 2 mm×1.75 mm.

13. The dental implant cleaning device of claim 1, wherein the at least one of cross-hatching and plurality of dimples define a distance between hatches and dimples, and wherein the distance is between 0.25 mm and 1 mm.

14. The dental implant cleaning device of claim 1, wherein the elongated cleaning member comprises at least one of sodium bicarbonate, calcium bicarbonate, sodium hydrogen carbonate, and a low abrasion water-soluble mineral.

15. The dental implant cleaning device of claim 1, wherein the elongated cleaning member defines a flavor comprising at least one of peppermint, spearmint, and cinnamon.

16. The dental implant cleaning device of claim 1, wherein the first elongated member defines a length that is between 75 mm and 95 mm, the elongated cleaning member defines a length that is between 50 mm and 90 mm, and the second elongated member defines a length that is between 75 mm and 95 mm, and wherein the first elongated member, the elongated cleaning member, and the second elongated member define a total length that is substantially equal to 240 mm.

17. The dental implant cleaning device of claim 1, wherein the first elongated member and the second elongated member define a first hardness that is less than or equal to a Shore A hardness of 50.

18. The dental implant cleaning device of claim 17, wherein the elongated cleaning member defines a second hardness, and the second hardness is different from the first hardness.

* * * * *